United States Patent
Sun et al.

(10) Patent No.: US 11,059,742 B2
(45) Date of Patent: Jul. 13, 2021

(54) THERMALLY STABLE, FLEXIBLE SUBSTRATES FOR ELECTRONIC DEVICES

(71) Applicant: Akron Polymer Systems, Inc., Akron, OH (US)

(72) Inventors: Limin Sun, Copley, OH (US); Dong Zhang, Uniontown, OH (US); Jiaokai Jing, Uniontown, OH (US); Frank W. Harris, Boca Raton, FL (US); Zhikuan Lu, Hudson, OH (US); Xiaoliang Zheng, Hudson, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 0 days.

(21) Appl. No.: 13/891,603

(22) Filed: May 10, 2013

(65) Prior Publication Data

US 2014/0037930 A1 Feb. 6, 2014

Related U.S. Application Data

(60) Provisional application No. 61/645,707, filed on May 11, 2012.

(51) Int. Cl.
| | | |
|---|---|---|
| C09D 179/08 | (2006.01) | |
| C03C 17/32 | (2006.01) | |
| C08G 73/10 | (2006.01) | |
| G06F 1/16 | (2006.01) | |
| G02F 1/1333 | (2006.01) | |
| B32B 17/06 | (2006.01) | |

(52) U.S. Cl.
CPC ............ *C03C 17/32* (2013.01); *B32B 17/064* (2013.01); *C08G 73/1042* (2013.01); *C08G 73/1067* (2013.01); *C08G 73/1078* (2013.01); *C09D 179/08* (2013.01); *G02F 1/133305* (2013.01); *G06F 1/1652* (2013.01); *B32B 2379/08* (2013.01); *Y10T 428/265* (2015.01); *Y10T 428/31623* (2015.04)

(58) Field of Classification Search
CPC .......................... C08G 69/48; C08G 73/1042; C08G 73/1067; C08G 73/1078; B32B 17/10; B32B 17/064; B32B 2379/08; C03C 17/32; C09D 179/08; G02F 1/133305; G06F 1/1652; Y10T 428/265; Y10T 428/31623
USPC ................ 428/435, 1.3, 473.5, 216; 528/353
See application file for complete search history.

(56) References Cited

U.S. PATENT DOCUMENTS

| | | | | |
|---|---|---|---|---|
| 5,026,823 A | | 6/1991 | Summers et al. | |
| 5,310,863 A | * | 5/1994 | Sachdev ............ | C08G 73/1014 428/473.5 |
| 5,480,964 A | * | 1/1996 | Harris .................... | C08G 69/26 428/473.5 |
| 5,580,950 A | * | 12/1996 | Harris ................ | C08G 73/1075 528/350 |
| 6,214,923 B1 | * | 4/2001 | Goto ....................... | C08L 79/08 428/473.5 |
| 7,820,253 B2 | * | 10/2010 | Harris ................ | C08G 73/1039 428/1.3 |
| 2001/0008321 A1 | * | 7/2001 | Ito ...................... | B60H 1/00671 264/250 |
| 2003/0125503 A1 | * | 7/2003 | Sakamoto ............... | C08L 71/00 528/125 |
| 2005/0256295 A1 | * | 11/2005 | Sakayori ................. | C08L 79/08 528/310 |
| 2006/0106193 A1 | * | 5/2006 | Moriyama ............... | G02B 1/04 528/310 |
| 2006/0229384 A1 | * | 10/2006 | Sakayori ................. | C03C 17/32 523/160 |
| 2007/0093640 A1 | * | 4/2007 | Kim ........................ | C08G 69/26 528/332 |
| 2007/0169886 A1 | * | 7/2007 | Watanabe .............. | H05K 1/036 156/325 |
| 2008/0237552 A1 | * | 10/2008 | Zhang .................. | C09D 125/18 252/582 |
| 2008/0286498 A1 | * | 11/2008 | Lin ..................... | C08G 73/1064 428/1.3 |
| 2009/0209725 A1 | * | 8/2009 | Teshiba .............. | C08G 73/1042 528/229 |

(Continued)

FOREIGN PATENT DOCUMENTS

| | | | | |
|---|---|---|---|---|
| EP | 2744851 | | 6/2014 | |
| JP | 2006058540 A | | 3/2005 | |
| JP | 2005163012 A | | 6/2005 | |
| JP | 2005354052 A | | 12/2005 | |
| JP | 2006063133 | | 3/2006 | |
| JP | 2006063133 A | * | 3/2006 | |
| JP | WO 2009058396 A1 | * | 5/2009 | ............ C09K 19/32 |
| JP | 2011095697 | | 12/2011 | |

(Continued)

OTHER PUBLICATIONS

West et al. ("Mechanism of unidirectional liquid-crystal alignment on polyimides with linearly polarized ultraviolet light exposure" Appl. Phys. Lett. 1998, 72, p. 2403-2405).*

(Continued)

*Primary Examiner* — Travis M Figg
(74) *Attorney, Agent, or Firm* — Benesch, Friedlander, Coplan & Aronoff LLP

(57) ABSTRACT

A flexible substrate with a high optical transparency (>80% from 400 to 750 nm) that is retained after exposure to 300° C., near-zero birefringence (<±0.001), and a relatively low CTE (<60 ppm/° C.) is disclosed. The substrate may be manufactured as single layer, polyimide films and as a multi-layer laminate comprising a polyimide layer and a thin glass layer. The polyimides may include alicyclic dianhydrides and aromatic, cardo diamines. The films formed of the polyimides can serve as flexible substrates for optical displays and other applications that require their unique combination of properties.

10 Claims, No Drawings

(56) References Cited

U.S. PATENT DOCUMENTS

| | | | |
|---|---|---|---|
| 2009/0231518 A1* | 9/2009 | Sekiguchi | B32B 27/34 349/96 |
| 2009/0305046 A1* | 12/2009 | Bito | C08K 5/103 428/409 |
| 2010/0110554 A1* | 5/2010 | Lida | G02B 5/3083 359/615 |
| 2010/0187719 A1* | 7/2010 | Oishi | C08G 73/1075 264/216 |
| 2010/0193748 A1* | 8/2010 | Hama | C09J 11/04 252/503 |
| 2011/0109855 A1* | 5/2011 | Kilickiran | C08G 73/1075 349/123 |
| 2012/0077401 A1* | 3/2012 | Kotake | B32B 27/42 442/147 |
| 2015/0321398 A1* | 11/2015 | Bharathan | B29C 39/02 264/254 |

FOREIGN PATENT DOCUMENTS

| | | | |
|---|---|---|---|
| WO | 2009058396 A1 | 5/2009 | |
| WO | WO 2009058396 A1 * | 5/2009 | C09K 19/32 |
| WO | 2011033690 | 3/2011 | |
| WO | 2012/173126 | 12/2012 | |
| WO | 2013154141 | 10/2013 | |

OTHER PUBLICATIONS

JP 2006063133 A Machine Translation.*

Nishikawa, M. et al., "Mechanism of Undirectional Liquid-Crystal Alignment on Polyimides with Linearly Polarized Ultraviolet Light Exposure" App. Phys. Lett., vol. 72(19), 2403 (1998).

Kang, Byeong , "Advances in Flexible Display Research" Presentation at 8th Annually Flexible Electronics and Displays, Feb. 3, 2009, Phoenix, AZ.

Rollings, Keith, "Latest Development of Polyester Film for Flexible Electronics and Photovoltaics," Presentation at 8th Annually Flexible Electronics and Displays, Feb. 4, 2009, Phoenix, AZ.

Angiolini, Simone; Avidano, Mauro; Braaco, Roberto; Barlocco, Carlo; Young, Michael Trainor, and Zhao, Xiao-Mei, "Hight Performance Plastic Substrates for Active Matrix Flexible FPD", Proc. SID 2003 (Digest of Technical Papers), May 2003, Baltimore MD USA, vol. XXXIV, pp. 1325-1328.

Specification of DuPont Kapton polymide film, from DuPont High Performance materials website Mar. 2012 pp. 1-7.

Specification of Ube "Ube Ultra-High Heat-Resistant Polyimide Film" from Ube Industrial website. (2009) pp. 1-6.

Matsurura, Tohru; Hasuda, Yoshinori; Nishi, Shiro, and Yamada, Noriyoshi, "Polyimide Derived from 2w, 2—Bis (trifluoromethyl)- 4, 4'-diaminobiphenyl", Macromol., 24, 5001 (1991).

Roh, Nam-Seok, "Manufacturing Plastic Display for Mobile Devices, Presentation at 8th Annually Flexible Elecronics and Displays", Feb. 3, 2009, Phoenix, AZ.

Cherenack, K.H., Kattamis, A.Z.; Hekmatshoar, B.; Sturm, J., and Wagnar, S, "Self-Aligned Amorphous Silicon Thin Film Transistors with Mobility Above 1 cm2V-1S-1 Fabricated at 300 DegreesC on Clear Plastic Substrates," Mater. Res. Soc. Symp. Proc. vol. 1066 (2008).

Numata, S; Fujisake, K., and Kinjo, K, "Re-examination of the Relationship Between Packing Coefficient and Thermal Expansion Coefficient for Aromatic Polyimides," Polymer, vol. 28, 2282 (1987).

Hasegawa, M.; Matano, T.; Shindo Y., and Sugimura, T., "Spontaneous Molecular Orientation of Polyimides Induced by Thermal Imidization," Macromolecules, 29, 7897 (1996).

Genuth, I, "Improving Flexibility", hhtp://biztechmagazione.com/article.asp?item_id=537, Mar. 11, 2009 pp. 1-3.

International Search Report with Written Opinion, Int'l filing date: May 10, 2013, PCT/US13/40527.

Extended European Search Report; dated Nov. 5, 2015; 7 pages.

* cited by examiner

THERMALLY STABLE, FLEXIBLE SUBSTRATES FOR ELECTRONIC DEVICES

RELATED APPLICATIONS

This application claims priority to U.S. Provisional Application No. 61/645,707, filed on May 11, 2012, entitled THERMALLY STABLE SUBSTRATES FOR FLEXIBLE FLAT PANEL DISPLAYS.

FIELD OF THE INVENTION

The application relates to the manufacture of transparent, flexible substrates for electronic devices, such as flat panel displays, photovoltaic systems, lighting devices, and input/output devices. Specifically, the flexible substrates include those prepared from organo-soluble, fully imidized polyimides with high glass transition temperatures (Tgs). This application also relates to the manufacture of flexible substrates in the form of thick polyimide films or multi-layer laminates containing at least one polyimide layer and one thin glass layer. More particularly, this application relates to the manufacture of thermally stable, flexible substrates with near-zero birefringence and a relatively low coefficient of thermal expansion (CTE).

BACKGROUND

The next-generation of optical displays, including liquid crystal displays (LCDs), organic light emitting diodes displays (OLEDs), and electrophoretic displays (EPDs), will be flexible. The glass substrates currently used in such displays are thick, heavy, rigid, and vulnerable to breaking, reducing product design freedom. Polymer substrate materials are attractive because they open new possibilities for product design and fabrication. They can be produced using cost effective roll-to-roll manufacturing which can increase production efficiencies over glass materials and lower the manufacturing costs. For example, the glass substrate is one of the most expensive components in a LCD (DisplaySearch 2007 Materials Report). Therefore, a flexible substrate material would allow for radical design freedom for information displays.

There are materials available that display some of the target properties and that have been utilized to fabricate commercial thin, planar, light-weight displays i.e. cell phone displays. Although some of these materials have also been used to fabricate rollable and conformable prototype displays, none of these devices are commercially viable due to their poor performance and production yields. The performance and durability of these displays could be greatly increased if the processing temperatures, namely the temperature at which the metal deposition step is carried out, could be increased. The conductivity and robustness of the metal layers are increased as the deposition temperature is increased. However, the processing temperatures are limited by the lack of a thermally stable material with a high Tg that displays all the targeted properties. This need for a flexible substrate that is stable at high temperatures is also shared by many electronic devices, such as lighting devices, photovoltaic devices, and electronic input/output devices. Numerous approaches have been used to develop flexible LCD devices that meet the property requirements. Some efforts have included using metal foils, such as stainless steel. Stainless steel foil has a high thermal stability, low CTE (<20 ppm/° C.), and is flexible. However, stainless steel foil is relatively heavy and is not transparent. This limits the use of this material to reflective mode displays. In addition, extra coatings have to be applied on the stainless foil because of its conductivity and surface roughness.

Organic polymers have also been used in producing thin light weight displays, but it has proven difficult to obtain a polymer substrate with properties that match all of the thermal and optical properties of a glass plate. For example, polyethylene naphthalate (PEN) films are highly transparent and have a low CTE (<20 ppm/° C.). However, PEN films can only be processed below 180° C. and the film exhibits high birefringence (>0.001). Despite these limitations, PEN substrates are offered commercially by DuPont, which reflects the market need. Poly(cycloolefin) (COP) films have excellent transparency, high thermal stability (Tg>300° C.) and almost zero birefringence, but the CTE of these films is too large (>70 ppm/° C.) for display applications.

The outstanding thermal properties of polyimides make them natural candidates for substrates. Two commercial polyimide films, Kapton® of Dupont Co (USA) and Upilex® of Ube Co (Japan) have excellent mechanical properties and Tgs higher than 350° C., but the films are dark orange and cannot be cast directly from solution. Due to their insolubility, they must be prepared from precursor polyamic acid films, which further limits their utility. Due to their rigid rod structure, polyimide films usually have a relatively low CTE (the CTE of a UpilexR film can be <10 ppm/° C.), and a very high birefringence (for a UpilexR film, this value can be >0.1). Using specifically designed monomers, soluble polyimides have been prepared and solution cast into highly transparent films. In fact, such films have found commercial success as negative compensation films for LCDs, but these films are highly birefringent. Thus, no polyimide film has been commercialized with high optical transmittance, near zero birefringence, a relatively low CTE and a high Tg. As discussed above, the substrate is required to have near zero birefringence, i.e., the refractive index along the direction perpendicular to the film plane (nz) and along the directions parallel to the film plane (nx or ny) must be identical. Conventional polyimides are composed of rigid rod-like, aromatic monomer units. During solution casting of soluble polyimides or polyamic acid precursors in the absence of stress, the polymer chains spontaneously orient in-plane, but without preferential in-plane orientation, resulting in zero in-plane birefringence, i.e., nx=ny. However, this process generates negative out-of-plane birefringence, i.e., nz<nx=ny. In fact, polyimides prepared from linear rod-like, aromatic monomers (negative birefringent monomers) form films with a high negative birefringence. This prevents such films from being used as display substrates where optical isotropy is required to avoid display distortion. Previous approaches to obtaining polyimide films with low birefringence have involved increasing the flexibility and/or decreasing the linearity of the rigid polyimide backbone. However, these approaches also result in a dramatic decrease in the glass transition temperature.

Transparent polyimide films have also been prepared by solution casting that exhibit positive out-of-plane birefringence. This has been accomplished through the use of specifically designed cardo diamine monomers (positive birefringent monomers). The monomers have been polymerized with aromatic dianhydrides to give polymer backbones that spontaneously orient in-plane during the casting process. However, the repeat units which result from the positive birefringent monomers have high polarizability perpendicular to the polymer backbone that results in an out-of-plane refractive index (nz) higher than that of the in-plane refractive indices (nx and ny).

Cardo diamines have also been polymerized with alicyclic dianhydrides to form soluble polyimides. The polymers have been primarily used to form alignment layers for LCDs. Alicyclic polyimide coatings on a polyolefin substrate have been stretched to form a birefringent compensation film. However, no attempt has been made to utilize their optical and thermal properties in the development of substrates for electronic devices that require near zero birefringence.

SUMMARY

In one embodiment, a transparent, flexible substrate for an electronic device includes an organo-soluble polyimide with a Tg>300° C. that is prepared from a mixture of at least one dianhydride and at least one diamine, wherein the at least one dianhydride is an alicyclic dianhydride and the at least one diamine is an aromatic, cardo diamine. In one embodiment, the electronic device is a flat panel display, a lighting device, a photovoltaic device or an input/output device. In yet another embodiment, the flexible substrate has a thickness of at least 25 microns and a transmittance from 400 to 750 nm that is >80%. In another embodiment, the flexible substrate has an out-of-plane birefringence of less than about ±0.001, a coefficient of thermal expansion of less than about 60 ppm/° C.

In yet another embodiment, the organo-soluble polyimide has the general structure:

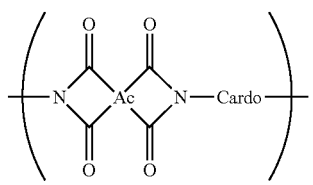

wherein AC is selected from the group:

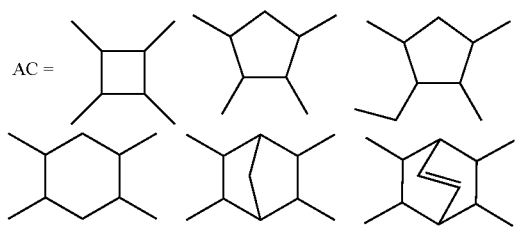

wherein Cardo is selected from the group:

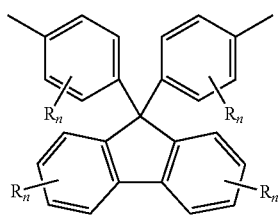

R = H, Br, phenyl, phenylethynyl

R═H, Br, phenyl, phenylethynyl
wherein n=1-4 and R is selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, ethynyl, phenylethynyl, alkyl ester and substituted alkyl esters, and combinations thereof. It is to be understood that when n is less than 4 the remaining positions on the aromatic ring are assumed by hydrogen atoms. It is also to be understood that each R can be different.

In another embodiment, the at least one alicyclic dianhydride is selected from the group with the general structures:

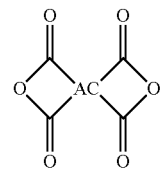

wherein AC is selected from the group:

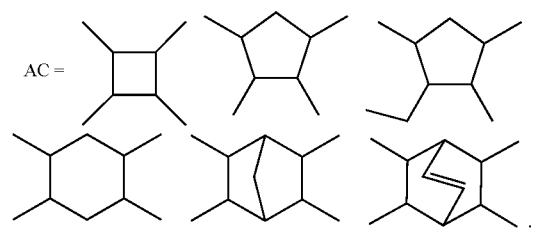

and may further be selected from the group including 1,2,3,4-cyclobutanetetracarboxylic dianhydride, 1,2,3,4-cyclopentanetetracarboxylic dianhydride, 1,2,4,5-cyclohexanetetracarboxylic dianhydride, and bicyclo[2.2.2]oct-7-ene-2,3,5,6-tetracarboxylic dianhydride.

In another embodiment, the aromatic, cardo diamine is selected from the group with general structure:

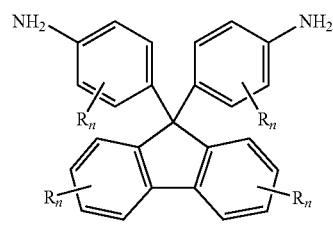

wherein n=1-4 and R is selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, ethynyl, phenylethynyl, alkyl ester and substituted alkyl esters, and combinations thereof. It is to be understood that when n is less than 4 the remaining positions on the aromatic ring are assumed by hydrogen atoms. It is also to be understood that each R can be different. The aromatic, cardo diamine may further be selected from the group comprising 9,9-bis(4-aminophenyl)fluorine, 9,9-bis (4-amino-3-fluorophenyl)fluorine, and 9,9-bis(4-amino-3-methylphenyl)fluorine.

DETAILED DESCRIPTION

Surprisingly, it has been discovered that soluble polyimides with Tgs>300° C. can be used in the manufacture of transparent flexible substrates with near zero birefringence that maintain excellent transparency after exposure to 300° C. for 10 minutes in air, or for 30 minutes under reduced pressure or in an inert atmosphere. In particular, it has been found that polyimides that are prepared from alicyclic dianhydrides and aromatic, cardo dianhydrides can be used in the manufacture of transparent substrates (transmittance of greater than 80% at 400 nm to 750 nm) with an out-of-plane birefringence of less than ±0.001 and a CTE of less than 60 ppm/° C. The substrates can be used in the manufacture of flexible, electronic devices where they are exposed to high temperatures. The polyimides may generally be prepared from alicyclic dianhydrides and aromatic diamines. Alicyclic dianhydrides may be selected from the group:

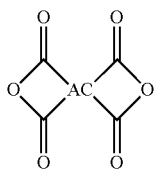

wherein Ac is selected from the group:

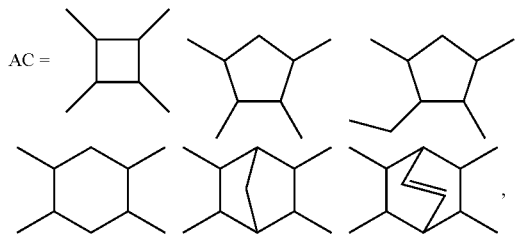

and particularly useful dianhydrides include:

1,2,3,4-Cyclobutanetetracarboxylic dianhydride (CBDA);

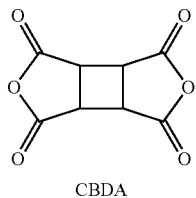 [SMILES: O=C1OC(=O)C2C1C1C(=O)OC(=O)C21]

1,2,3,4-Cyclopentanetetracarboxylic dianhydride (CPDA);

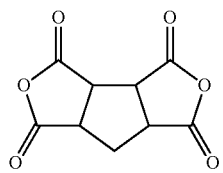 [SMILES: O=C1OC(=O)C2C1CC1C(=O)OC(=O)C12]

1,2,4,5-Cyclohexanetetracarboxylic dianhydride (HPMDA); and

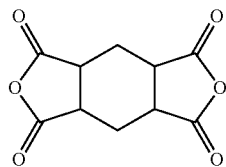 [SMILES: O=C1OC(=O)C2CC3C(=O)OC(=O)C3CC12]

Bicyclo[2.2.2]oct-7-ene-2,3,5,6-tetracarboxylic dianhydride (BODA).

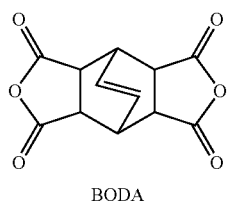

The aromatic diamines may have the following structure:

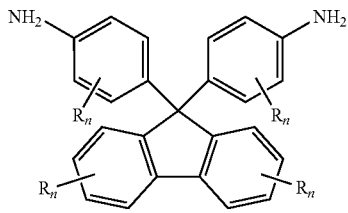

wherein n=1-4 and R is selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, ethynyl, phenylethynyl, alkyl ester and substituted alkyl esters, and combinations thereof. It is to be understood that when n is less than 4 the other positions on the aromatic ring are assumed by hydrogen atoms. It is also to be understood that each R can be different.

Particularly useful diamines include:

9,9-Bis(4-aminophenyl)fluorene (FDA);

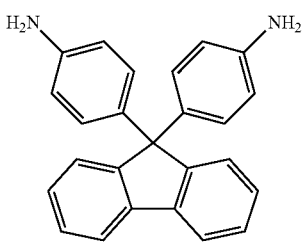 [SMILES: Nc1ccc(C2(c3ccc(N)cc3)c3ccccc3-c3ccccc32)cc1]

9,9-Bis(4-amino-3-fluorophenyl)fluorene (FFDA); and

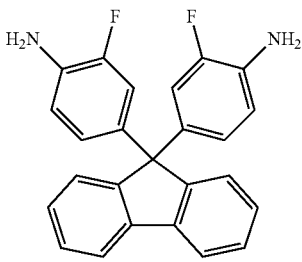 [SMILES: Nc1ccc(C2(c3ccc(N)c(F)c3)c3ccccc3-c3ccccc32)cc1F]

9,9-Bis-(4-amino-3-methylphenyl)fluorene (MeFDA).

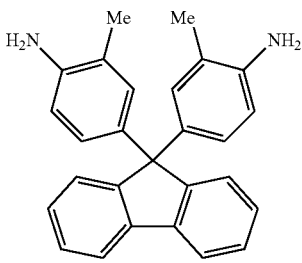 [SMILES: Cc1cc(C2(c3ccc(N)c(C)c3)c3ccccc3-c3ccccc32)ccc1N]

In one embodiment, the polyimide may be prepared from monomer mixtures containing one or more alicyclic dianhydrides and one or more cardo, aromatic diamines. In some cases, it may be desirable to substitute some of the cardo diamine with a non-cardo, aromatic diamine, and/or some of the alicyclic dianhydride with an aromatic dianhydride. In particular, it may be useful to include a monomer containing a group, such as a carboxyl group, that can be used in crosslinking the polymer so as to induce solvent resistance. When this group is present crosslinking can be induced by heating near 300° C. or by heating above 200° C. in the presence of a multi-functional epoxide. The monomers can be polymerized in high boiling solvents, such DMAC, NMP or m-cresol, which can contain an imidization catalyst, such as isoquinoline, at elevated temperatures to directly yield the imidized polymer. The polymerization mixture may also contain a dehydration reagent such as toluene.

In another embodiment, the monomers can be polymerized in polar aprotic solvents below 100° C. to yield a low molecular weight polyamic acid that is imidized either chemically or thermally imidized. In yet another embodiment, imidization can also be carried out by a combination of these two methods. In fact, a combination of the two methods may be useful for the continuous casting of film directly from the polyamic acid polymerization mixture.

The flexible substrates are prepared as single layer, films and as multi-layer laminates comprising a polyimide layer and a thin glass layer. The single layer films can be prepared by solution casting techniques known to those skilled in the art from solutions of the imidized polyimides in common organic solvents. Both batch and continuous processes, such as a roll-to-roll process, may be used. In both techniques, the viscosity of the solution is adjusted by adjusting the solids concentration and the polymer molecular weight so that optimum films may be produced with the equipment used.

The multi-layer laminates can be prepared in one step by solution casting a layer of the polyimide on thin glass films. Additives may be used to increase the adhesion of the polyimide to the glass. The laminates may also be prepared in a multi-step process, wherein a polyimide layer is first solution cast on a carrying tape such as a polyester film. The combination is then laminated to the glass film so that the polyimide layer adheres to the glass. The carrying tape is removed prior to or during the construction of the flat panel display.

The substrates can also be prepared by solution casting techniques from solutions of the polyamic acid precursors to the polyimides. In this case, the conversion of the polyamic acid to the polyimide is carried out chemically and/or thermally during or subsequent to the casting process. A continuous, roll-to-roll process whereby the polyamic acid is mixed with a chemical imidization mixture immediately prior to casting on an endless belt, which passes through heated zones, can be used to prepare single layer substrates or to form a polyimide layer on a glass film.

In order to simplify the construction of a flexible electronic device such as a display, other functional and non-functional layers may be cast on or laminated to the substrate. For example, a gas barrier layer might be added.

General Polymerization Procedures

The following general procedure may be used to prepare a polyimide from a cardo diamine and an alicyclic dianhydride in a high boiling solvent:

To a three-neck, round-bottom flask (250 mL) that was equipped with an overhead stirrer, a nitrogen inlet, and a short path distillation apparatus, 0.040 mol of the cardo diamine and 60 ml of m-cresol was added to form a mixture. The mixture was heated to about 60° C. under nitrogen with stirring until all the diamine dissolved. The alicyclic dianhydride (about 0.040 mol) was added to the mixture to form a reaction mixture, which was heated at about 100° C. until all the dianhydride dissolved. The heating bath was then removed, and the reaction mixture was allowed to cool to room temperature and was then stirred for about 4 hours. After several drops of isoquinoline were added, the reaction mixture was heated to about 200° C. for 12 hours. During this process, water and some m-cresol were removed by distillation. The reaction mixture was then diluted with 50 ml of m-cresol, allowed to cool to room temperature and then added to 500 ml of methanol. The fibrous precipitate that formed was collected by filtration, soaked in methanol to remove the majority of the solvent (process was repeated three times) and then dried under reduced pressure at 100° C.

Polymer solubility. The solubility of the polymer was determined in N-methyl-pyrrolidinone (NMP), N,N-dimethylacetamide (DMAc) and cyclopentanone (CPN). The results are shown in Table 1. The polymer was considered soluble if a 5 wt % solution could be prepared.

Preparation of film for substrate qualification. The dry polymer was dissolved in cyclopentanone with a solids content between 5-20%. (Films could also be prepared from solutions of the polymers in polar aprotic solvents.) After filtration, the solution was poured on a glass substrate. The solvent was allowed to evaporate at ambient temperature.

The glass substrate containing the film was dried at 100° C. under reduced pressure. The polymer film was removed from the glass by dipping the substrate glass in water.

noxy)phenyl]propane dianhydride (BisADA), which was used in place of the alicyclic dianhydride and FDA (2a), FFDA (2b), and MeFDA (2c) (Table 1).

TABLE 1

Polymerization of BODA, BPDA and BisADA

| Dianhydride | Diamine | Example No. | NMP | DMAc | CPN | Out of Plane $\Delta n$ | CTE ppm/° C. | Tg° C. | T % at 400 nm Initial | Final* |
|---|---|---|---|---|---|---|---|---|---|---|
| BODA | FDA | 1a | Yes | Yes | No | −0.0002 | 47 | 445 | 85.7 | 80.6 |
|  | FFDA | 1b | Yes | Yes | Yes | +0.0003 | 45 |  |  |  |
|  | MeFDA | 1c | Yes | Yes | Yes | +0.0009 | 47 | 440 | 83.4 | 81.0 |
| BPDA | FDA | Comparative 1a | Yes | No | No | −0.0380 | 32 |  |  |  |
|  | FFDA | Comparative 1b | Yes | Yes | Yes | −0.0276 | 38 |  | 57.0 |  |
|  | MeFDA | Comparative 1c | Yes | Yes | Yes | −0.0240 | 36 |  |  |  |
| BisADA | FDA | Comparative 2a | Yes | Yes | Yes | −0.0115 | 55 |  |  |  |
|  | FFDA | Comparative 2b | Yes | Yes | Yes | −0.0099 | 56 |  | 83.1 |  |
|  | MeFDA | Comparative 2c | Yes | Yes | Yes | −0.0073 | 62 |  |  |  |

*After thermal treatment at 300° C. for 30 minutes under reduced pressure.

Film birefringence. The birefringence of the freestanding film (25 μm) was determined on a Metricon Prism Coupler 2010/M.

Film transparency. Transparency was measured by determining the transmittance of a 25 μm thick film from 400 to 750 nm with a UV-Visible spectrometer (Shimadzu UV 2450). The transmittance was determined before and after the film was heated at 300° C. for 10 minutes in air or under reduced pressure or an inert atmosphere for 30 minutes. A plot of transmittance vs. wavelength was nearly identical to that of commercial PEN substrates. The minimum transmittance of the films, which is given in Table 1, was at 400 nm. If the film was heated under these conditions for longer than 60 minutes the transmittance at 400 nm was less than 80%.

EXAMPLES

Examples 1a-c

BODA was polymerized by the general polymerization procedure with FDA (1a), FFDA (1b), and MeFDA (1c) (Table 1).

Comparative Examples 1a-c

The general polymerization procedure was carried out with the aromatic dianhydride 3,3',4,4'-Biphenyltetracarboxylic acid dianhydride (BPDA), which was used in place of the alicyclic dianhydride and FDA (1a), FFDA (1b), and MeFDA (1c) (Table 1).

Comparative Examples 2a-c

The general polymerization procedure was carried out with the aromatic dianhydride bis[4-(3,4-dicarboxyphe- As shown in Table I, examples 1a-c produced polymers that formed films with a near zero birefringence and excellent transparency. Specifically, examples 1a-c had a transmittance of greater than 80% from 400 nm to 750 nm with an out-of-plane birefringence of less than ±0.001 and a CTE of less than 60 ppm/° C.

Examples 2a-h

The general polymerization procedure was carried out with HPMDA and various mixtures of FFDA (98 mol % to 88 mol %) and PFMB (2 mol % to 12 mol %) (Table 2).

Example 3

The general polymerization procedure was carried out with HPMDA and a mixture of FFDA (90 mol %) and ODA (10 mol %) (Table 2).

Example 4

The general polymerization procedure was carried out with HPMDA (90 mol %) and 6FDA (10 mol %) and FFDA (Table 2).

Example 5

The general polymerization procedure described was carried out with HPMDA and FDA (Table 2).

TABLE 2

Polymerization of HPMDA

| Dianhydride | Diamine | | Example No. | NMP | DMAc | CPN | Out of Plane Δn | CTE ppm/°C. | Tg °C. | T % at 400 nm Initial | T % at 400 nm Final* |
|---|---|---|---|---|---|---|---|---|---|---|---|
| HPMDA 100% | FFDA 100% | | 2a | Yes | Yes | Yes | 0.0018 | 59 | 426 | 86.8 | 82.5 |
| | FFDA 98% | PFMB 2% | 2b | Yes | Yes | Yes | 0.0012 | 57 | 427 | 87.5 | 82.5 |
| | FFDA 97% | PFMB 3% | 2c | Yes | Yes | Yes | 0.0008 | 55 | 431 | 87.3 | 82.9 |
| | FFDA 96% | PFMB 4% | 2d | Yes | Yes | Yes | 0.0005 | 60 | 428 | 87.6 | 85.2 |
| | FFDA 95% | PFMB 5% | 2e | Yes | Yes | Yes | 0.0004 | 60 | 427 | 87.4 | 84.5 |
| | FFDA 92% | PFMB 8% | 2f | Yes | Yes | Yes | 0.0002 | 54 | 433 | 87.2 | 82.0 |
| | FFDA 90% | PFMB 10% | 2g | Yes | Yes | Yes | −0.0005 | 59 | 422 | | |
| | FFDA 88% | PFMB 12% | 2h | Yes | Yes | Yes | −0.0009 | 55 | 422 | | |
| HPMDA 100% | FFDA 90% | ODA 10% | 3 | Yes | Yes | No | −0.0003 | 55 | 428 | 85.7 | 82.0 |
| HPMDA 90% 6FDA 10% | FFDA 100% | | 4 | Yes | Yes | Yes | 0.0001 | 58 | 422 | 85.0 | 80.6 |
| HPMDA 100% | FDA 100% | | 5 | Yes | Yes | No | 0.0009 | 45 | | 83.3 | |

*After thermal treatment at 300° C. for 10 minutes in air.

As shown in Table II, the selected dianhydrides and diamines, and mixtures thereof, along with the percentages used may be varied in the reaction mixtures to form polyimides that can be used to form acceptable flexible substrates.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Therefore, the application, in its broader aspects, is not limited to the specific details, the representative apparatus and method, and illustrative examples shown and described. Accordingly, departures may be made from such details without departing from the spirit or scope of the applicant's general inventive concept.

The invention claimed is:

1. A substrate for use in or with electronic devices, wherein the substrate comprises:
    an organo-soluble polyimide film having an out of plane birefringence of less than about ±0.002, wherein the organo-soluble polyimide has a glass transition temperature greater than about 300° C. and is comprised of:
        an alicyclic dianhydride selected from the group consisting of: 1,2,3,4-cyclopentanetetracarboxylic dianhydride, 1,2,4,5-cyclohexanetetracarboxylic dianhydride, and bicyclo[2.2.2]oct-7-ene-2,3,5,6-tetracarboxylic dianhydride; and
        at least one aromatic cardo diamine selected from the group consisting of 9,9-bis(4-aminophenyl)fluorene, 9,9-bis(4-amino-3-fluorophenyl)fluorene, and 9,9-bis(4-amino-3-methylphenyl)fluorene; and
    wherein:
        the film is flexible and has a thickness of less than about 50 microns and a transmittance of greater than about 80% at about 400 nm to about 750 nm both before the film is heated and after the film is heated to 300° C. for no longer than 60 minutes.

2. The substrate of claim 1, wherein the electronic device is a flat panel display, a lighting device, a photovoltaic device, or an input/output device.

3. The substrate of claim 1, wherein the film has a thickness of at least 25 microns.

4. The substrate of claim 1, wherein the film has a coefficient of thermal expansion of less than about 60 ppm/°C.

5. The substrate of claim 1, wherein the polyimide further comprises an aromatic dianhydride.

6. The substrate of claim 1, wherein the polyimide further comprises a non-cardo, aromatic diamine.

7. A substrate for use in or with electronic devices, wherein the substrate consists essentially of:
    a single polymer layer having a thickness of less than about 50 microns comprising:
        an organo-soluble polyimide having a glass transition temperature greater than about 300° C. and an out of plane birefringence of less than about ±0.002, wherein the organo-soluble polyimide comprises at least one alicyclic dianhydride selected from the group consisting of 1,2,3,4-cyclopentanetetracarboxylic dianhydride, 1,2,4,5-cyclohexanetetracarboxylic dianhydride, and bicyclo[2.2.2]oct-7-ene-2,3,5,6-tetracarboxylic dianhydride; and at least one aromatic cardo diamine selected from the group consisting of 9,9-bis(4-aminophenyl)fluorene, 9,9-bis(4-amino-3-fluorophenyl)fluorene, and 9,9-bis(4-amino-3-methylphenyl)fluorene; and a glass layer;

wherein the single polymer layer has a transmittance of greater than about 80% at about 400 nm to about 750 nm both before and after it has been exposed to 300° C. for no longer than 60 minutes, and is flexible.

8. The substrate of claim 7, wherein the single polymer layer has a thickness of at least 2 microns.

9. The substrate of claim 7, wherein the glass layer has a thickness of at least 20 microns.

10. The substrate of claim 7, wherein the single polymer layer has a coefficient of thermal expansion of less than about 60 ppm/° C.

\* \* \* \* \*